United States Patent [19]
Kobayashi et al.

[11] Patent Number: 5,740,011
[45] Date of Patent: Apr. 14, 1998

[54] SUPPORTING MECHANISM OF DISK UNIT IN MAGNETIC DISK APPARATUS HAVING LINK MECHANISMS ALIGNED WITH THE CENTER OF GRAVITY OF THE DISK ASSEMBLY

[75] Inventors: Isao Kobayashi; Jiro Kaneko; Kouki Uefune, all of Odawara; Tomio Suzuki, Hiratsuka; Tsuyoshi Takahashi, Odawara, all of Japan

[73] Assignee: Hitachi, Ltd., Tokyo, Japan

[21] Appl. No.: 557,816

[22] Filed: Nov. 14, 1995

[30] Foreign Application Priority Data

Nov. 30, 1994 [JP] Japan ................................ 6-297005

[51] Int. Cl.⁶ ............................. G06F 1/16; G11B 33/08
[52] U.S. Cl. ................................... 361/685; 248/634
[58] Field of Search ......... 364/708.1; 360/97.01–98.01, 360/137; 248/632, 634, 636, 638, 610, 611, 614, 645, 672, 673; 369/75.1, 263; 361/685

[56] References Cited

U.S. PATENT DOCUMENTS 4,387,453  6/1983  Zolt .
5,463,527  10/1995  Hager et al. ........................ 361/685

FOREIGN PATENT DOCUMENTS 341 957      11/1989  European Pat. Off. .
0567833A2    4/1993   European Pat. Off. .
567 833      11/1993  European Pat. Off. .
570 138      11/1993  European Pat. Off. .

OTHER PUBLICATIONS

IBM Technical Disclosure Bulletin, vol. 27, No. 4B, p. 2691, Sep., 1984. "Dynafocal Shock Mount", G. White.

*Primary Examiner*—Michael W. Phillips
*Attorney, Agent, or Firm*—Fay, Sharpe, Beall, Fagan, Minnich & McKee

[57] ABSTRACT

A magnetic disk apparatus includes a link mechanism constructed by at least a flexible portion and a hard member and one end of the link mechanism is attached to a fixing unit and the other end is attached to a hard disk assembly so that the flexible portion of the link mechanism is located on a straight line which passes through the center of gravity of the hard disk assembly, thereby having a sufficient rigidity for a disturbance in the straight line direction which acts on the HDA (Hard Disk Assembly) and reducing a natural frequency of the HDA for the disturbance in the rotating direction of the HDA.

9 Claims, 7 Drawing Sheets

SUPPORTING MECHANISM OF DISK UNIT IN MAGNETIC DISK APPARATUS HAVING LINK MECHANISMS ALIGNED WITH THE CENTER OF GRAVITY OF THE DISK ASSEMBLY

BACKGROUND OF THE INVENTION

The present invention relates to a magnetic disk apparatus and a disk array apparatus and, more particularly, to a magnetic disk apparatus constructed by supporting a hard disk assembly (hereinafter, referred to as an HDA) to a fixing unit by a supporting mechanism which can eliminate vibration from the outside and a disk array apparatus constructed by using a plurality of such magnetic disk apparatuses.

With respect to this kind of apparatus, a technique disclosed in EP0567833A2 corresponding to JP-A-6-12852 or the like is known.

According to such a technique, a plurality of cushion members are provided between the HDA and the fixing unit in order to support the HDA in the fixing unit and, in this instance, the plurality of cushion members are arranged so as to be located at specified geometric positions.

SUMMARY OF THE INVENTION

It is an object of the invention to provide a magnetic disk apparatus in which positioning accuracy of a head does not deteriorate even when vibration is applied from the outside and, further, to provide a reliable disk array apparatus using such magnetic disk apparatuses.

There is an aspect of the embodiment of the invention that the magnetic disk apparatus has a link mechanism comprising at least a flexible portion and a hard member and one end of the link mechanism is attached to the fixing unit and the other end is attached to a hard disk assembly so that the flexible portion of the link mechanism is located on a straight line which passes through the center of gravity of the hard disk assembly.

The flexible portion of the link mechanism can be attached between the hard disk assembly and the fixing unit on a straight line extending from an arbitrary position of the fixing unit to the center of gravity of the hard disk assembly. The fixing unit can have a generally rectangular shape and the flexible portion of the link mechanism can be also attached between the hard disk assembly and the fixing unit on straight lines extending from at least two corners of the fixing unit to the center of gravity of the hard disk assembly. The flexible portion at one end of the link mechanism can be attached to one end in the thickness direction of the fixing unit and the flexible portion at the other end of the link mechanism can be also attached to a part of the hard disk assembly on a straight line extending to the other end in the thickness direction of the fixing unit and also extending to the center of gravity of the hard disk assembly. Further, the link mechanism can be also attached between the hard disk assembly and the fixing unit on straight lines extending from four corners of the fixing unit to the center of gravity of the hard disk assembly. The fixing unit can have a generally U-shape and the link mechanism can be also attached between the hard disk assembly and both ends of the fixing unit on straight lines extending from at least both ends of the U-shape of the fixing unit to the center of gravity of the hard disk assembly. The fixing unit can have a generally flat plate shape and the link mechanism can be also attached between the hard disk assembly and both ends of the fixing unit on straight lines extending from at least both ends of the fixing unit to the center of gravity of the hard disk assembly.

The link mechanism has a total of four flexible portions at both end surfaces, which face each other, of a rectangular hard member in a manner such that one flexible portion is arranged at each end surface, the flexible portion at one end surface of each of the end surfaces of the hard member can be attached to the fixing unit, and the flexible portions at the other end surfaces of the hard member can be attached to the hard disk assembly. The link mechanism is formed by a hard member and the hard member is made of a rectangular plate member. Further, the link mechanism can be also formed by two hinge-shaped hard members each having a rectangular plate portion and a cylinder on one side of the plate portion or it can be also formed by overlapping the two plate portions of hard members through the flexible portion. The link mechanism can be formed by a rectangular plate member having flexibility, grooves are provided along both sides of the plate member, generally U-shaped hard members are fit into the grooves along both end surfaces of the plate member, one of the hard members can be attached to the fixing unit, and the other hard member can be attached to the hard disk assembly. The link mechanism can be also formed by a rectangular plate member having flexibility, bent portions are provided along both sides of the plate member formed by bending the plate member in a generally Z-shape, one of the plate portions extending from the bent portions is attached to the fixing unit, and the other plate portion is attached to the hard disk assembly. The link mechanism can be also formed in a manner such that both side portions, which face each other, of the rectangular flexible plate member are sandwiched by first hard members and the center of the plate member is sandwiched by second hard members from both surfaces of the plate member at predetermined intervals from the first hard members. The link mechanism can have first through holes along portions near both sides, which face each other, of the rectangular plate member having flexibility and a second through hole at the center of the plate member along both of the first through holes at predetermined intervals from the first through holes, and first hard members and a second hard member are inserted so as to be fitted to the first and second through holes, respectively. Further, the magnetic disk apparatus is constructed by a plurality of magnetic disk apparatuses and those plurality of magnetic disk apparatuses can be arranged in a casing.

The magnetic disk apparatus having the supporting mechanism with the structure as mentioned above and the magnetic disk array apparatus in which the plurality of the magnetic disk apparatuses are arranged have a sufficient rigidity for a disturbance in the straight line direction which acts on the HDA. Since a natural frequency of the HDA for the disturbance in the rotating direction of the HDA is reduced, an influence by the disturbance of frequencies higher than the natural frequency can be especially eliminated.

DESCRIPTION OF THE PREFERRED EMBODIMENTS

An embodiment of a magnetic disk apparatus and a disk array apparatus according to the invention will now be described in detail hereinbelow with reference to the drawings.

Figure 1:
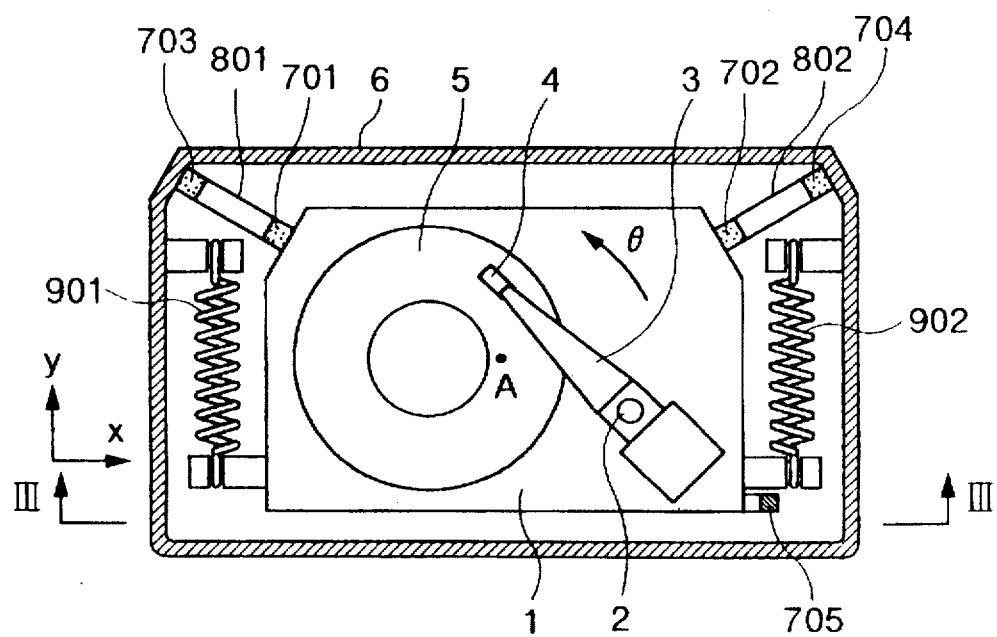
FIG. 1 is a front view showing a first embodiment of a magnetic disk apparatus having a supporting mechanism of the invention.

FIG. 1 is a front view showing a construction of a magnetic disk apparatus according to the first embodiment of the invention. FIG. 1 shows an example of vertically installing the magnetic disk apparatus. In FIG. 1, reference numeral 1 denotes an HDA; 2 a pivot; 3 an arm; 4 a head; 5 a rotary disk; 6 a fixing unit; 701 to 705 hinges; 801 and 803 links; and 901 and 902 self-weight compensating members.

As shown in FIG. 1, in the magnetic disk apparatus, the HDA 1 is supported by two sets of supporting devices in the fixing unit 6 having a generally rectangular shape. The HDA 1 is constructed by the rotary disk 5 and the arm 3 which is supported by the pivot 2 and to which the head 4 that is rotatable around the pivot 2 as a rotational center is attached. The supporting devices are constructed by two sets of link mechanisms. One of the link mechanisms is constructed by connecting the hinge 701, link 801, and hinge 703 in a line and the other link mechanism is constructed by connecting the hinge 702, link 802, and hinge 704 in a line. The hinge 703 in one of the link mechanisms is fixedly attached to the fixing unit 6, the hinge 701 is fixedly attached to the HDA 1, the hinge 704 in the other link mechanism is fixedly attached to the fixing unit 6, and the hinge 702 is fixedly attached to the HDA 1, thereby supporting the HDA 1 into the fixing unit 6.

One (hinge 701, link 801, hinge 703) of the link mechanisms is arranged on a straight line which passes through a center of gravity (A) of the HDA 1. The other link mechanism (hinge 702, link 802, hinge 704) is also similarly arranged on a straight line which passes through the center of gravity (A) of the HDA 1. By such arrangements, the HDA 1, one of the link mechanisms, a side of the fixing unit 6, the other link mechanism, and HDA 1 construct a link mechanism of four nodes having a shape which is generally trapezoidal. Among them, the links are formed by relatively hard members and the hinges are formed by relatively soft members.

According to the first embodiment of the invention, by constructing the link mechanism of four nodes as mentioned above, rigidities in the horizontal direction (hereinafter, referred to as an (x) direction) and the vertical direction (hereinafter, referred to as a (y) direction) of the HDA 1 are assured and a rigidity in the rotational direction (hereinafter, referred to as a θ direction) of the disk 5 can be reduced. Also, even when an external force in the rectilinear directions of the (x) and (y) directions acts on the fixing unit 6, the external force is not converted to a motion in the θ direction of the HDA 1. In other words, since a natural frequency in the θ direction of the disk 5 decreases, even when a disturbance larger than the natural frequency is applied, the HDA 1 is not influenced by such a disturbance.

As shown in FIG. 1, the self-weight compensating members 901 and 902 for the HDA 1 are provided between the HDA 1 and the fixing unit 6 in order to compensate the self-weight of the HDA 1 which acts in the (-y) direction, thereby lightening tensile forces acting on the hinges 701 to 704 and the links 801 and 802. It is preferable to use, for instance, coil springs each having a small spring constant as self-weight compensating members 901 and 902. In the case where the hinges 701 to 704 and the links 801 and 802 have sufficient strengths, the self-weight compensating members 901 and 902 can be also omitted.

Figure 2:
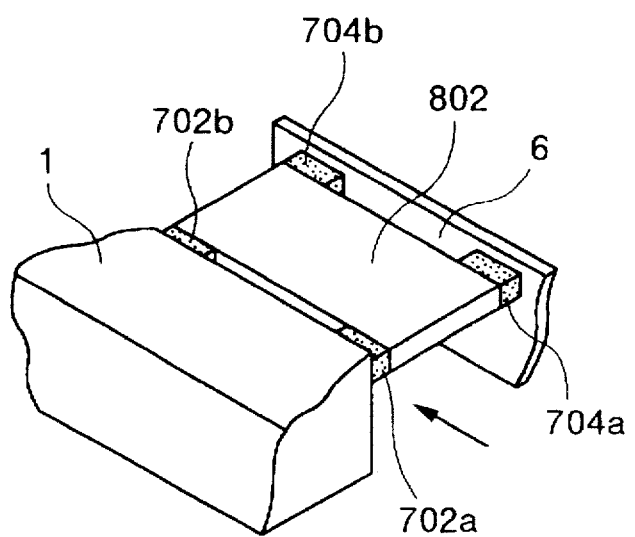
FIG. 2 is a perspective view showing an example of a link mechanism as a supporting mechanism.

FIG. 2 shows the link mechanism which is used in the first embodiment of the invention. A direction indicated by an arrow of the link mechanism shown in FIG. 2 is a direction when the portion of the hinge 702, link 802, and hinge 704 shown in FIG. 1 are seen from the paper surface above. As shown in FIG. 2, in the link mechanism, one side of each of two hinges 702a and 702b is fixedly attached to one end surface of the plate-shaped link 802 and the other sides of the two hinges 702a and 702b are fixedly attached to the HDA 1. One side of each of two hinges 704a and 704b is fixedly attached to the other end surface of the link 802 and the other sides of the hinges 704a and 704b are fixedly attached to the fixing unit 6. One hinge may be also attached to each end surface of both of the end surfaces of the link 802.

Figure 14:
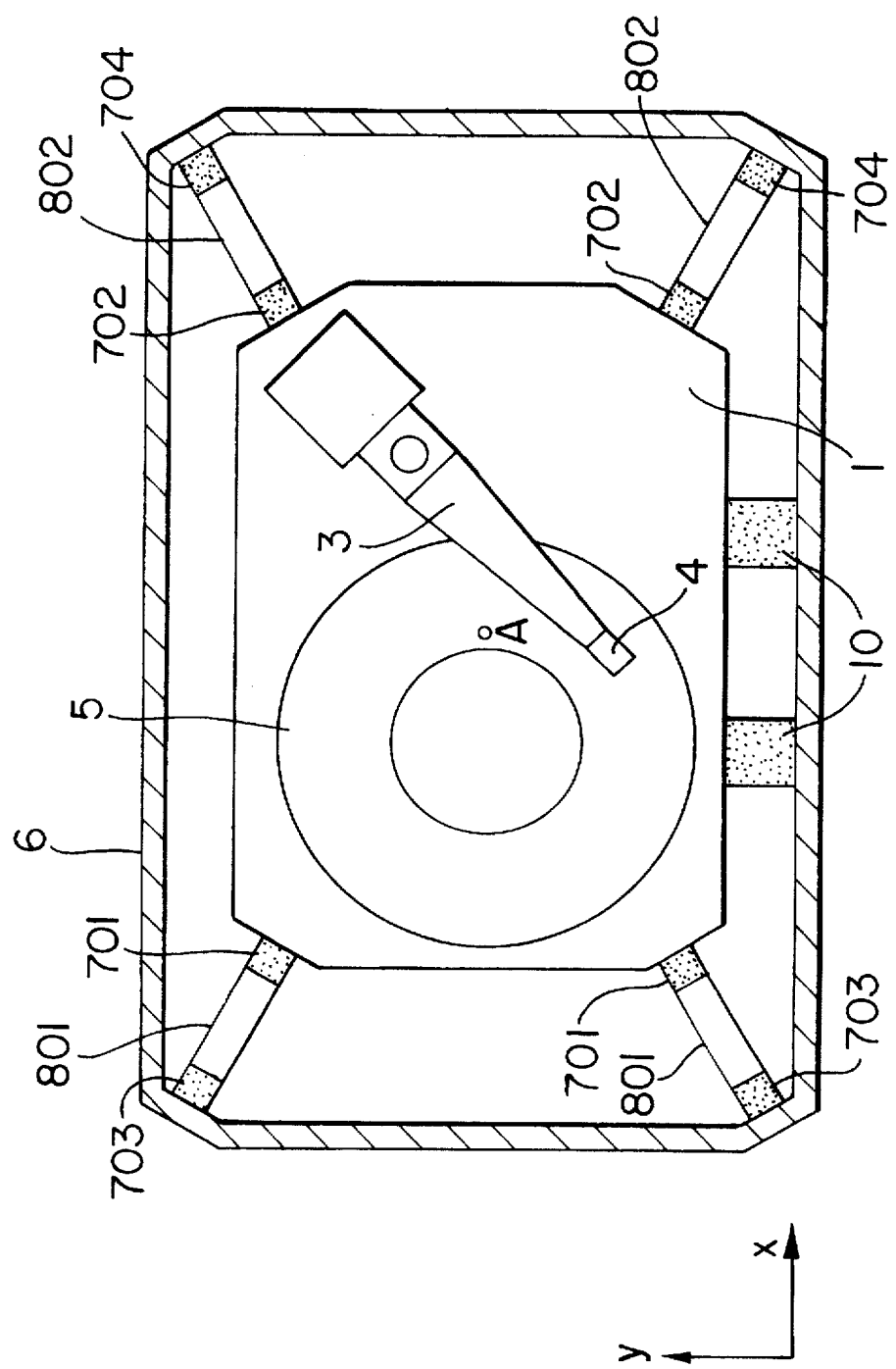
FIG. 14 is a front view showing an embodiment of the magnetic disk apparatus having a link mechanism attached between the hard disk apparatus and the fixing unit at the four corners of the fixing unit.

Although FIG. 1 has been described on the assumption that two sets of link mechanisms described in FIG. 2 are used, the invention may be also constructed by using further larger number of link mechanisms. For example, the invention may be also constructed by using four sets of link mechanisms arranged on straight lines extending from the four corners of the fixing unit 6 to the center of gravity (A) of the HDA 1 as shown in FIG. 14. In this case, although it is necessary to change lengths of links so as to permit motion in the θ direction of the HDA 1, such a structure may be easily realized by using rubbers as hinges. By using the rubbers as hinges, it may be prevented that an impact which is applied to the fixing unit 6 is transferred to the HDA 1. Although FIG. 1 shows an installation posture of the magnetic disk apparatus, even when the magnetic disk apparatus is installed so that the disk 5 is horizontally placed, the positions of the link mechanisms are not changed.

According to the invention, when a subsidiary effect as mentioned above is not requested, general turning pair elements may be also used in place of the rubbers as hinges of the link mechanisms. Although the above-mentioned first embodiment of the invention has been shown with respect to the example in which the installing positions of the link mechanisms have been set to the corners of the fixing unit 6, the installing positions of the link mechanisms may be also set to any positions as long as they are located on the straight lines which pass through the center of gravity (A) of the HDA 1.

Figure 3:
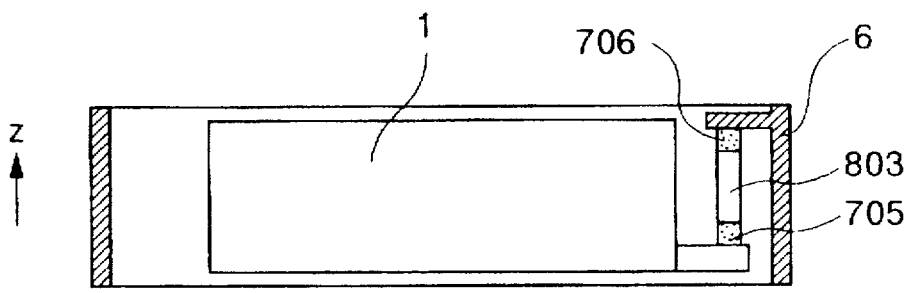
FIG. 3 is a cross sectional view taken along the line III—III in FIG. 1.

Although the embodiment has been described above with respect to the support in the vertical direction of the HDA 1 to the fixing unit 6, a support in the lateral direction (direction perpendicular to the paper surface of FIG. 1 and, hereinafter, it is referred to as a (z) direction) will now be described with reference to FIG. 3. FIG. 3 is a cross sectional view taken along the line III—III in FIG. 1.

As shown in FIG. 3, the third link 803 is attached to the HDA 1 through the hinge 705 and is attached to the fixing unit 6 through the hinge 706 so that the HDA 1 is supported to the fixing unit 6 in the (z) direction. The hinges 705 and 706 are arranged on a straight line perpendicular to a plane including four-node link mechanism described previously as a construction having HDA 1, the link 801, the fixing unit 6 and link 802.

As mentioned above, by supporting the HDA 1 to the fixing unit 6 through the link mechanism comprising the hinges 705 and 706 and link 803, a rigidity in the (z) direction when the HDA 1 is supported to the fixing unit 6 may be improved. When an external force in the (z) direction is small, such a link mechanism may be also omitted.

Figure 4:
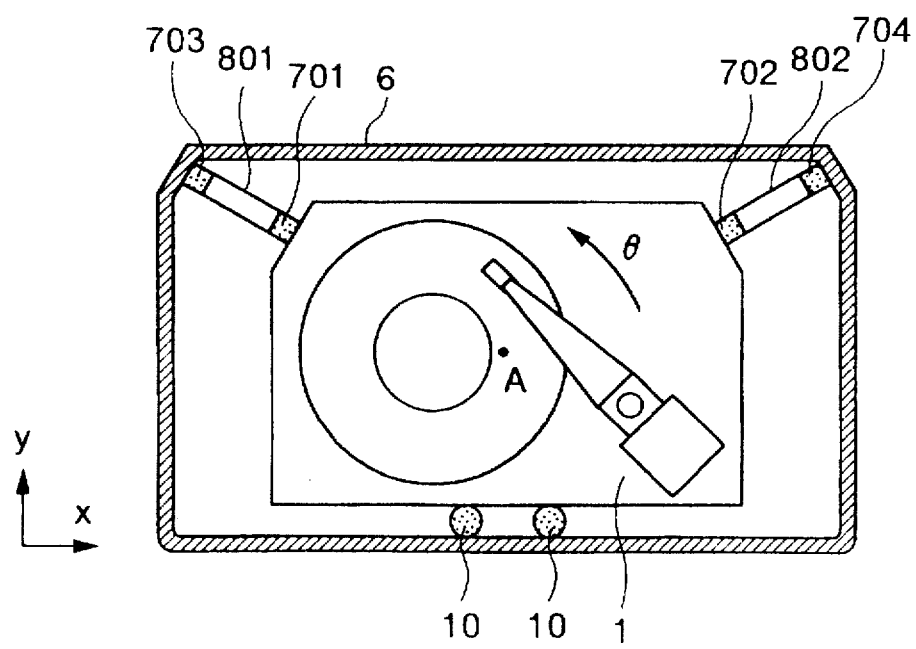
FIG. 4 is a front view showing a second embodiment of the magnetic disk apparatus having the supporting mechanism of the invention.

FIG. 4 is a front view showing a construction of the magnetic disk apparatus according to the second embodiment of the invention. In FIG. 4, reference numeral 10 denotes an elastic member and the other component elements similar to those shown in FIG. 1 are designated by the same reference numerals.

In the magnetic disk apparatus shown in FIG. 4, the elastic member 10 is provided between the HDA 1 and the fixing unit 6 in place of the self-weight compensating members 901 and 902 provided for the first embodiment so as to support the self-weight (y direction) of the HDA 1. The other component elements are constructed in a manner similar to those in FIG. 1.

The elastic member 10 has a cylindrical shape and supports the self-weight of the HDA 1 and simultaneously acts as a restriction force in the direction (z direction) perpendicular to the paper surface by a frictional force between the HDA 1 and the elastic member 10 and a frictional force between the elastic member 10 and the fixing unit 6. A restriction force for the θ direction of the HDA 1 is very small. That is, the elastic member 10 acts in a manner similar to the self-weight compensating members 901 and 902 in FIG. 1 and the third link mechanism in FIG. 3. A metal, plastics, or rubber is preferable as a material of the elastic member 10.

According to the second embodiment of the invention as mentioned above, without providing the link mechanism comprising the hinge 705, link 803, and hinge 706 shown in FIG. 3, the rigidity against the disturbance in the straight line direction may be assured in a manner similar to the first embodiment and the rigidity in the θ direction may be reduced.

Figure 5:
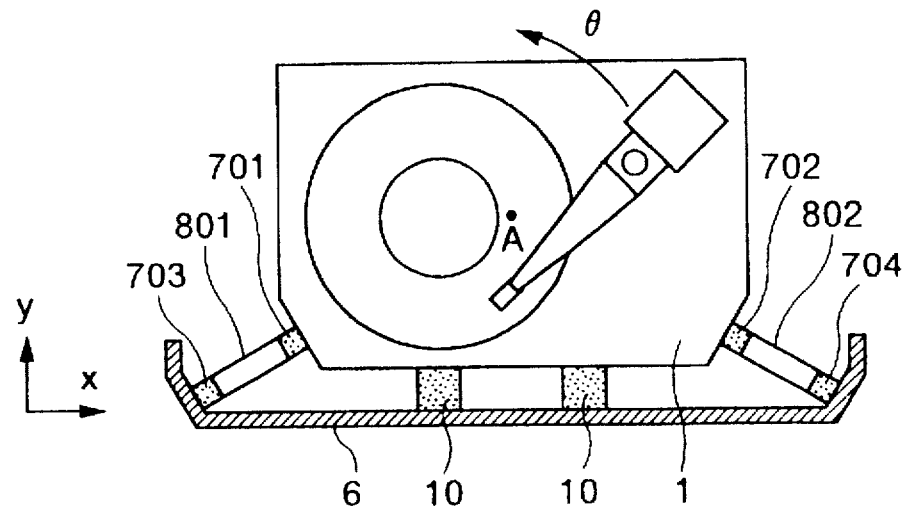
FIG. 5 is a front view showing a third embodiment of the magnetic disk apparatus having the supporting mechanism of the invention.

FIG. 5 is a front view showing a construction of the magnetic disk apparatus according to the third embodiment of the invention. In FIG. 5, the same component elements as those shown in FIG. 4 are designated by the same reference numerals.

The first and second embodiments of the invention have been described above with respect to the case where the link mechanism has been provided between the upper side portion of the fixing unit 6 and the upper side portion of the HDA 1 to thereby support the HDA 1 to the fixing unit. According to the third embodiment of the invention shown in FIG. 5, however, the link mechanism is provided between the lower side portion of the fixing unit 6 and the lower side portion of the HDA 1 to thereby support the HDA 1 to the fixing unit 6. The self-weight of the HDA 1 is compensated by the rectangular parallelepiped elastic member 10 in place of the cylindrical elastic member 10 described by FIG. 4.

As shown in FIG. 5, the elastic member 10 provided between the HDA 1 and the fixing unit 6 is constructed by a rectangular parallelepiped rubber. Generally, a spring constant in the shearing direction (x direction) of the rubber is equal to about ⅕ to ¹⁄₁₀₀₀ of the spring constant in the compressing direction (y direction). Thus, the rigidities in the (y) and (z) directions may be assured in a manner similar to the case where the cylindrical elastic member is provided as described with reference to FIG. 4. Although the link mechanism is provided between the lower side portion of the fixing unit 6 and the lower side portion of the HDA 1 and its arranging direction differs from those in the cases of the first and second embodiments, the rigidity for the disturbance in the straight line direction can be assured and the rigidity in the θ direction may be reduced as long as the hinges at both ends forming the link mechanism are located on the straight line which passes through the center of gravity (A) of the HDA 1. The embodiment of the invention shown in FIG. 14 also shows a rectangular elastic member 10 between the HDA 1 and the fixing unit 6.

Figure 6:
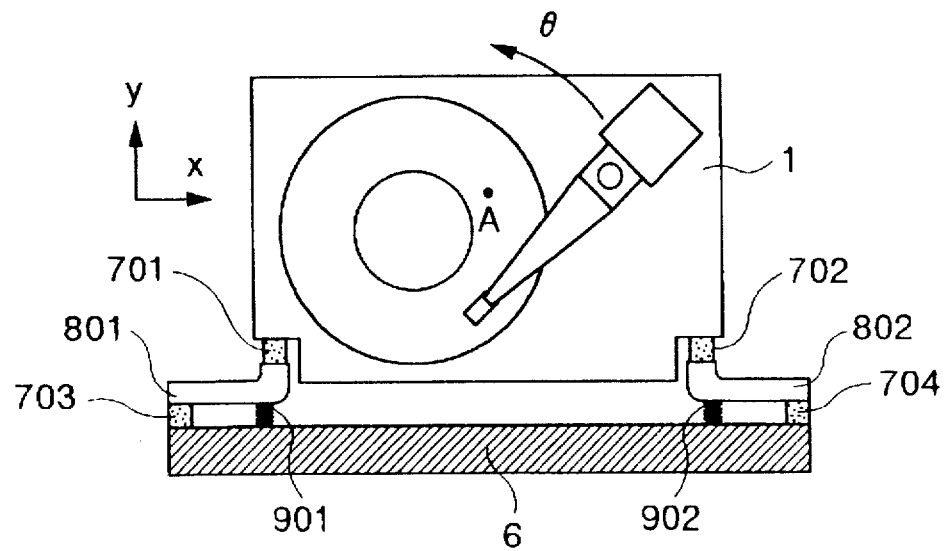
FIG. 6 is a front view showing a fourth embodiment of the magnetic disk apparatus having the supporting mechanism of the invention.

FIG. 6 is a front view showing a construction of the magnetic disk apparatus according to the fourth embodiment of the invention. In FIG. 6, the same component elements as those shown in FIG. 1 are designated by the same reference numerals.

In FIG. 6, the link mechanism in the third embodiment of the invention described by FIG. 5 is constructed by the links 801 and 802 each having an L shape and the hinges 701 to 704 provided for both ends of the links 801 and 802, and the HDA 1 is supported by the fixing unit 6 in the lower side portion of the HDA 1. With such a construction as well, by arranging the hinges 701 and 703 and the hinges 702 and 704 on straight lines which pass through the center of gravity (A) of the HDA 1, a rigidity for the disturbance in the straight line direction may be assured and a rigidity in the θ direction may be reduced.

Further, the self-weight compensating member 901 is provided between the fixing unit 6 and the link 801 and the self-weight compensating member 902 is provided between the fixing unit 6 and the link 802, respectively. By arranging the self-weight compensating members 901 and 902 as mentioned above, external forces acting on the hinges 703 to 704 and the links 801 and 802 may be reduced.

Figure 7:
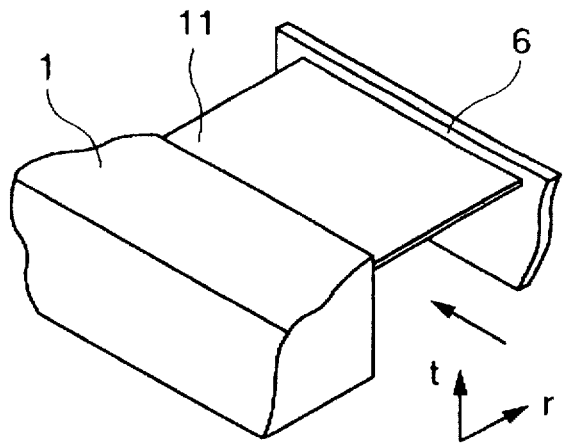
FIG. 7 is a perspective view showing another example of the link mechanism as a supporting mechanism.

FIG. 7 is a perspective view showing a construction of a supporting device for explaining the fifth embodiment of the invention. In FIG. 7, a plate member 11 is used as a link mechanism. The plate member 11 is used in place of the link 802 and the hinges 702a, 702b, 704a, and 704b shown in FIG. 2 and is arranged in a portion similar to the portion described in FIG. 2.

That is, in the magnetic disk apparatus according to the fifth embodiment of the invention, the HDA 1 is supported to the fixing unit 6 by the plate member 11. The plate member 11 is arranged on a plane which passes through the center of gravity (A) of the magnetic disk apparatus in a manner to obtain the advantage similar to the cases of the foregoing embodiments. As a material of the plate member 11, it is preferable to use a metal, plastics, rubber, or the like.

In this case as well, a rigidity for the disturbance in the straight line direction described by FIG. 2 can be assured and a rigidity in the rotating direction of the disk 5, namely, in the θ direction can be reduced. Further, when it is assumed that a direction along the straight line which passes through the center of gravity of the magnetic disk apparatus is set to an (r) direction, and a direction which crosses perpendicularly to the (r) direction is set to a (t) direction, so long as a rigidity in the (r) direction of the plate member 11 provided between the HDA 1 and the fixing unit 6 is equal to approximately 100 times or more as large as a rigidity in the (t) direction, the HDA 1 may be supported to the fixing unit 6 by using any member as a plate member 11.

FIGS. 8 to 12 are diagrams showing examples of other various constructions of the link mechanism which may be used as a supporting device for the magnetic disk apparatus according to the foregoing first to fourth embodiments of the invention. The constructional examples of the link mechanism will now be described hereinbelow.

Figure 8:
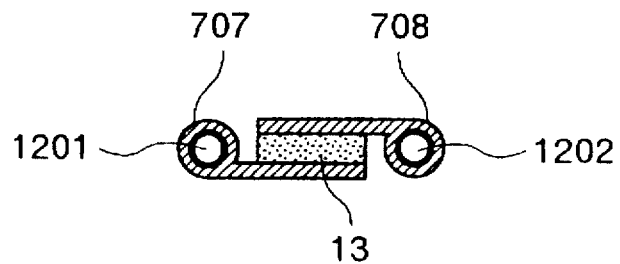
FIG. 8 is a side elevational view showing another example of the link mechanism.

A link mechanism shown in FIG. 8 comprises hinges 707 and 708 and a rubber 13 for connecting the hinges 707 and 708. In the link mechanism, a portion between the hinges 707 and 708 operates as a link. General turning pair elements may be used as hinges 707 and 708. A hole of the hinge 707 is fit to a rod member 1201 on the fixing unit 6 side and a hole of the hinge 708 is fit to a rod member 1202 on the HDA 1 side.

In the link mechanism shown in FIG. 8, since the rubber 13 expands and compresses in the expanding and compressing directions, the advantage similar to that of the link mechanism previously described are achieved. In other words, impact applied to the fixing unit 6 may be reduced against the HDA 1.

Figure 9:
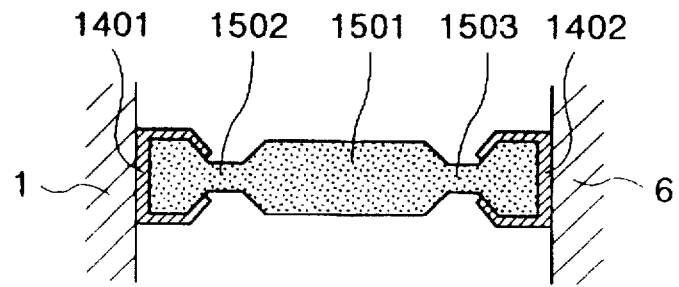
FIG. 9 is a side elevational view showing another example of the link mechanism.

A link mechanism shown in FIG. 9 is constructed by connecting an attaching portion 1401 on the HDA 1 side and an attaching portion 1402 on the fixing unit 6 side by a rubber 1501. The rubber 1501 has groove portions 1502 and 1503 which operate as hinges and a portion between the groove portions 1502 and 1503 operates as a link.

Figure 10:
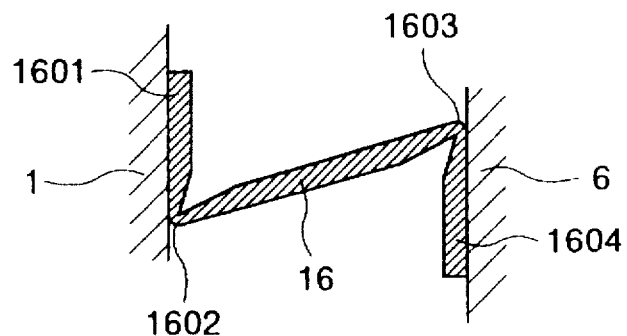
FIG. 10 is a side elevational view showing another example of the link mechanism.

A link mechanism shown in FIG. 10 is constructed by forming an attaching portion 1601 on the HDA 1 side, bent portions 1602 and 1603, and an attaching portion 1604 on the fixing unit 6 side on one plastic plate member 16. The bent portions 1602 and 1603 operate as hinges and a portion between the bent portions 1602 and 1603 operates as a link, respectively.

Figure 11:
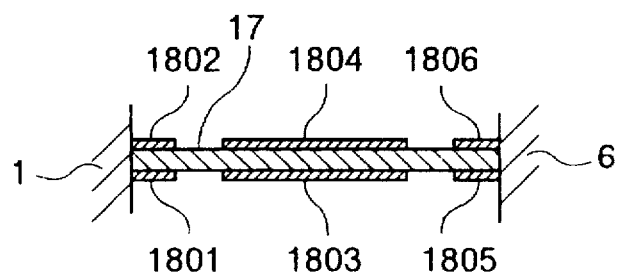
FIG. 11 is a side elevational view showing another example of the link mechanism.

A link mechanism shown in FIG. 11 is constructed by arranging side plates 1801, 1802, 1803, 1804, 1805, and 1806 for a rubber plate member 17. Two portions which are not covered by side plates in the rubber plate member 17 operate as hinges and a portion between the two hinge portions operates as a link.

Figure 12:
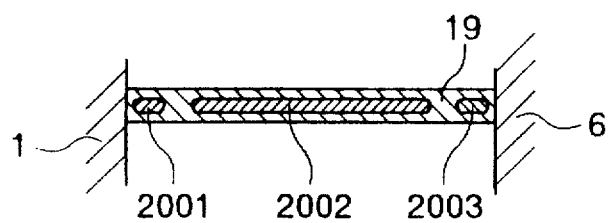
FIG. 12 is a side elevational view showing another example of the link mechanism.

A link mechanism shown in FIG. 12 is constructed by providing core plates 2001, 2002, and 2003 in one rubber plate member 19. Two portions having no core plate operate as hinges and a portion between the two hinges operates as a link.

The link mechanisms shown in FIGS. 9 to 12 may reduce manufacturing costs. By supporting the HDA 1 to the fixing unit 6 by using such link mechanisms, a rigidity for the disturbance in the straight line direction of the magnetic disk apparatus may be assured and a rigidity in the θ direction can be reduced in a manner similar to the case of the magnetic disk apparatus using the link mechanism described by FIG. 2.

Figure 13:
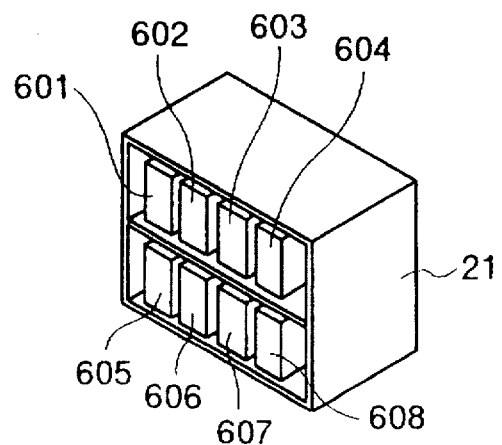
FIG. 13 is a perspective view showing an example in which a plurality of magnetic disk apparatuses each having the supporting mechanism of the invention are arranged in a casing.

FIG. 13 is a diagram showing an example of the disk array apparatus constructed by arranging a plurality of magnetic disk apparatuses according to the embodiments of the invention as mentioned above in the same casing.

The disk array apparatus shown in the diagram is constructed in a manner such that the magnetic disk apparatuses according to the foregoing embodiments of the invention each supporting the HDA (not shown) in each of fixing units 601 to 608 are fixed in a casing 21.

In the disk array apparatus constructed as mentioned above, a case may occur where a defect occurs in a portion of the magnetic disk apparatus, for example, in the magnetic disk apparatus having the fixing unit 602, and it is necessary to take out the magnetic disk apparatus from the casing 21 and to again insert a new magnetic disk apparatus into the casing 21. In this case, the casing 21 receives an impact in association with an exchange of the magnetic disk apparatus. Particularly, the fixing units 601 and 603 of the neighboring magnetic disk apparatuses are largely in danger of being oscillated by the natural frequency of the casing 21.

According to the magnetic disk apparatus of the invention as mentioned in the foregoing embodiments, since the frequencies in the θ direction when the HDA 1 supported in each of the fixing units 601 and 603 is supported may be reduced, even when the fixing units 601 and 603 are oscillated, such a vibration is eliminated by the supporting device, thereby making it possible to minimize a danger such that the HDAs 1 in the fixing units 601 and 603 are oscillated in the θ direction. On the other hand, since the rigidity in the straight line direction of the HDA 1 is high, the HDAs 1 don't collide in the fixing units 601 and 603. Such advantages are also similarly applied to the other fixing units among the fixing units 601 to 608 each having the HDA 1 therein.

What is claimed is:

1. A magnetic disk apparatus comprising a hard disk assembly supported by a fixing unit, wherein
said apparatus includes at least two link mechanisms, each having a flexible portion on each end of a hard member, and wherein
one end of each said link mechanism is attached to said fixing unit and an opposite end is attached to said hard disk assembly so that the flexible portions of said link mechanism are located on a straight line which passes through the center of gravity of said hard disk assembly.

2. An apparatus according to claim 1, wherein the flexible portions of each said link mechanism are attached between said hard disk assembly and said fixing unit on a straight line extending from an arbitrary position of said fixing unit to the center of gravity of said hard disk assembly.

3. An apparatus according to claim 2, wherein said fixing unit has a generally rectangular shape and the flexible portions of said link mechanisms are attached between said hard disk assembly and said fixing unit on straight lines extending from at least two corners of said fixing unit to the center of gravity of said hard disk assembly.

4. An apparatus according to claim 2, wherein the flexible portion at one end of each said link mechanism is attached to one end in the thickness direction of said fixing unit and the flexible portion at the opposite end of each said link mechanism is attached to a part of said hard disk assembly on a straight line extending to the other end in the thickness direction of said fixing unit and also extending to the center of gravity of said hard disk assembly.

5. An apparatus according to claim 2, wherein said link mechanisms are attached between said hard disk assembly and said fixing unit on straight lines extending from four corners of said fixing unit to the center of gravity of said hard disk assembly.

6. An apparatus according to claim 2, wherein the hard member of each said link mechanism has a flat plate shape.

7. An apparatus according to claim 1, wherein each said link mechanism includes two flexible portions at each end of said hard member.

8. An apparatus to claim 1, wherein said magnetic disk apparatus comprises a plurality of magnetic disk apparatuses arranged in a casing.

9. An apparatus according to claim 1, which further includes a third link mechanism comprising a hard member and a flexible portion formed on each end of the hard member, and wherein one flexible portion of said third mechanism is attached to said hard disk assembly and the other flexible portion thereof is attached to said fixing unit in a straight line perpendicular to a plane of said two link mechanisms.

* * * * *